Oct. 11, 1949.                A. EISELE                 2,484,697
                     FEELER HEAD FOR BORE GAUGES
                        Filed April 2, 1945
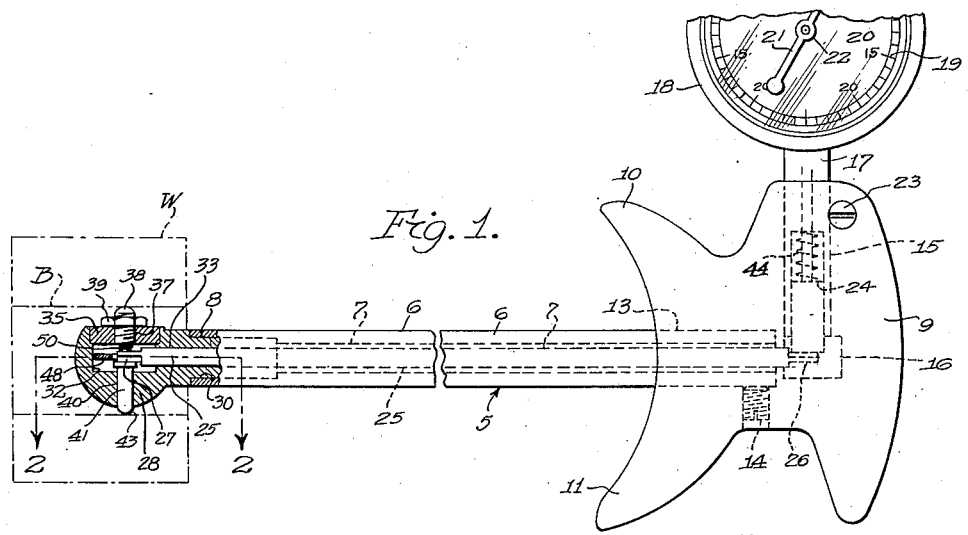
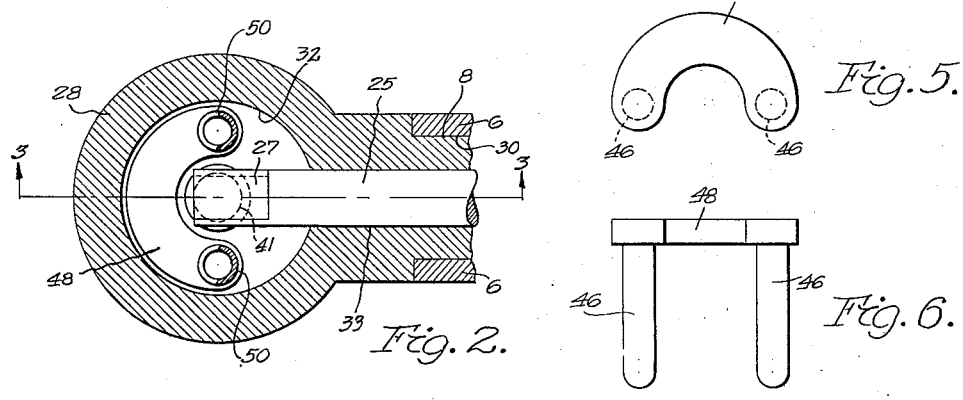
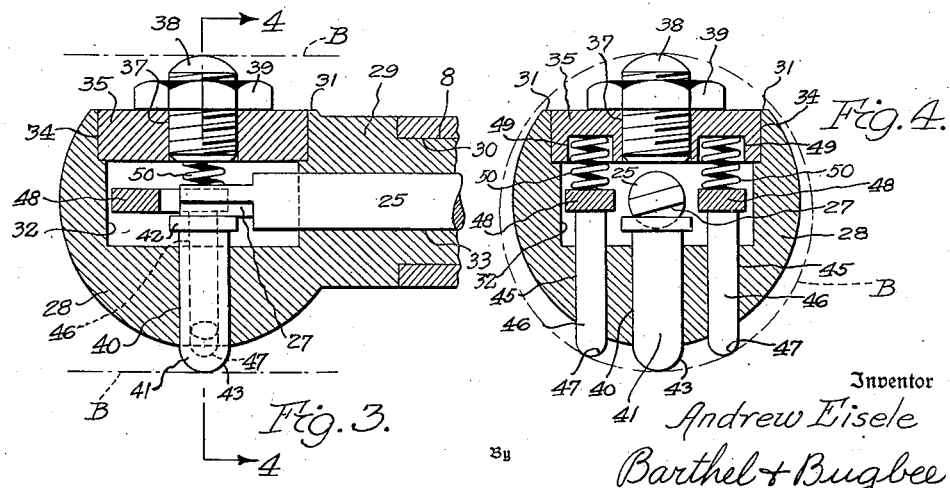
Inventor
Andrew Eisele
By Barthel + Bugbee
Attorneys

Patented Oct. 11, 1949

2,484,697

UNITED STATES PATENT OFFICE 2,484,697

FEELER HEAD FOR BORE GAUGES

Andrew Eisele, Detroit, Mich.

Application April 2, 1945, Serial No. 586,096

3 Claims. (Cl. 33—178)

1

The present invention relates to improvements in gauges and more particularly, to gauges for testing and checking internal dimensions or diamters of various parts and work pieces.

The primary object of the invention is to provide a gauge having a feeler head so constructed and arranged as to facilitate the measurement of internal diametrical dimensions of relatively small work pieces with the feeler contacts and associated mechanism constructed and contained in said feeler head in such a manner as to occupy a minimum amount of space.

Another object of the invention is to provide a gauge of the above-mentioned type with a pair of centering contact pins connected at their inner ends by means of an arcuately curved bridge member to provide sufficient space for the inner end of the feeler contact and motion transmitting rod associated therewith, whereby said feeler contact as well as the centering contact pins may be arranged in closely spaced positions and yet provide a gauge which is extremely accurate and precise.

Another object of the invention is to provide a gauge of the above-mentioned type in which the feeler head is formed spherical to allow rocking of said gauge within predetermined angular distances to thereby aid in determining a correct check or reading of the gauge when measuring the internal diameter of work pieces of relatively small size and dimensions.

Another object of the invention is to provide a gauge for measuring internal diameters of work pieces which is extremely accurate, has a high degree of precision and is compactly constructed to facilitate the checking and testing of relatively small bores and openings in various work pieces.

Other objects and advantages of the invention will become apparent during the course of the following description of the accompanying drawing, wherein:

Figure 1 is a side elevational view of the gauge embodying the invention, illustrating a portion broken away and partly in section to show the manner in which the feeler head is constructed and arranged;

Figure 2 is a horizontal cross-sectional view taken on line 2—2 of Figure 1, looking in the direction of the arrows and illustrating the shape of the centering pin connecting bridge and the manner of attaching the centering pins to the ends thereof;

Figure 3 is a vertical cross-sectional view taken on line 3—3 of Figure 2 looking in the direction of the arrows and showing the manner in which the feeler contact is disposed with its inner end in engagement with a flattened portion of a motion-transmitting rod therefor;

Figure 4 is a vertical cross-sectional view taken on line 4—4 of Figure 3 looking in the direction of the arrows and illustrating the manner in which the centering pins are yieldingly urged outwardly of the feeler head;

Figure 5 is a top elevational view of the centering pin connecting bridge showing the general shape and contour thereof; and Figure 6 is a side elevational view of the centering pins and connecting bridge, showing the manner in which the centering pins are connected to the ends of said bridge member.

In the drawing, the reference character 5 will generally be employed to represent a tubular shaft portion including a sleeve 6 having a bore 7 slightly enlarged at one end as at 8.

Secured to one end of the tubular shank 5 is a hand grip 9 having gripping portions 10 and 11 for receiving the fingers of the user. A bore 13 is formed in the hand grip 9 for receiving one end of the tubular shaft 5 and is adapted to be held in place by set screws or the like as at 14. The bore 13 communicates with the bore 15 extending at right angles thereto by means of a cutaway portion 16, and received in the bore 15 is the tubular support 17 of a dial type indicating gauge 18. A series of graduations and graduation markings 19 are formed on the dial 20 of said indicator gauge and a pointer 21 is mounted on a shaft 22 for registry with said indicating and graduation markings 19. The handle grip 9 is split rearwardly from the bore 15 for a portion of its width so that a clamping screw 23 may cause contraction of the bore 15 and thereby tightly grip the tubular portion 17 of the dial indicator and hold the same in position. A plunger 24 is slidably mounted in the tubular portion 17 of the dial indicator and is connected to the shaft 22 in such a manner as to cause rotation of said shaft a slight amount when the plunger 24 is reciprocated.

Extending through the tubular shaft 5 is a motion-transmitting rod 25 which has one end reduced and flattened as at 26 for engaging the plunger 24. The other end is similarly flattened as at 27 and projects beyond the outer end of said tubular shank 5. The flattened portions 26 and 27 are arranged at an angle relative to one another about the axis of the motion-transmitting rod 25 in such a manner that slight rotation of the flattened end portion 27 about the axis of the rod 25 will give a reading on the dial type indicator 18.

Supported on the free end of the tubular shank 5 is a gauge head, including a spherically shaped body portion 28 and the radially extending projection 29 slightly reduced in diameter as at 30 for being slidably received in the bore 8 of the tubular shank 5. The spherically shaped outer portion 28 is flattened as at 31 and is provided with an enlarged bore 32 forming a chamber into which the flattened end 27 of the motion-transmitting rod 25 is adapted to project after passing through a bore 33 in the tubular extension 29. The bore 32 is slightly enlarged as at 34 for receiving a closure plug 35 which is adapted to be frictionally held in place and may be forced into position by a press fit. The closure plate is threaded as at 37 for receiving an adjustable contact 38 and a locking nut 39 is threaded on the contact to retain the same in a predetermined adjusted position.

The spherical body portion 28 of the feeler head is provided with a radially extending bore 40 at right angles to the radially extending bore 33 for receiving a movable feeler contact 41 which has an enlarged head portion 42 for being engaged by the flattened portion 27 of a motion-transmitting rod 25 so that reciprocating motion imparted to the rounded end 43 of the movable feeler contact 41 will rotate said motion-transmitting rod 25 about its axis and cause reciprocation of the plunger 24 a corresponding amount which will be indicated on the dial type indicator 18. A coil spring 44 encircles the reduced portion of the plunger 24 so as to place the plunger under tension and cause the same to be rotated in a predetermined direction.

Arranged in parallel relation with the bore 40 on each side thereof is a pair of tangentially extending bores 45 which likewise communicate with the enlarged chamber 32 for receiving movable centering pins or contacts 46. The ends of the centering pins are rounded as at 47 so as to contactually engage the curvature of a bore or the like on both sides of the movable feeler contact 41. The inner ends of the centering pins or contacts 46 are connected by an arcuately shaped bridge piece 48 by being welded or otherwise secured thereto and said bridge piece is arranged to encircle the enlarged head 42 of the movable feeler contact 41 as well as the flattened end 27 of the motion-transmitting rod 25. The closure plug 35 is provided with a pair of recesses 49 in opposed relation to the inner end of the centering or contact pins 46 for receiving coil springs 50 therein, which are arranged so that they will engage the ends of the bridge piece 48 and yieldingly urge the centering or contact pins 46 in a projected position.

*Operation of the invention*

In determining the internal diameter of a bore B in a work piece W, the feeler head is inserted in the bore B so that the movable feeler contact 41 and adjustable contact 38 are in contactual engagement with the diametrical portions of said bore B. The centering pins 46 engage the bore B on opposite sides of the feeler contact 41 to retain the same and the feeler head in a centered position. As the feeler head is moved back and forth in the bore B, any irregularities in the surface therein will be indicated on the dial type indicator 18. By wobbling the hand grip 9 slightly, the feeler contact 41 and adjustable contact 38 may be brought into such a position as to give an exact reading of the inner diameter of the bore B in the work piece W.

It is to be understood that the form of the invention herewith shown and described is to be taken as a preferred embodiment of the same and that various changes may be made in the shape, size and arrangement of parts without departing from the spirit of the invention or the scope of the subjoined claims.

What I claim is:

1. In a bore gauge, a tubular shank having one end adapted to be connected to a dial indicator, a gauge head mounted on the other end of said shank, said head having a cavity therein and a plurality of bores extending from said cavity to the outside of said head, a motion-transmitting rod extending through said shank with one end projecting through one of said bores into said cavity and the other end projecting from said shank for connection to said indicator, a movable feeler contact pin extending outward through another of said bores with its inner end engaging the end of said motion-transmitting rod, a pair of centering pins mounted in a pair of said bores one on each side of the movable contact pin, an approximately U-shaped bridge member interconnecting said centering pins and partially encircling the end of said motion-transmitting rod, a spring in said head yieldingly engaging said bridge member and urging said centering pins outwardly of said head, and a stationary contact pin projecting outwardly from said head in the opposite direction from said movable measuring pin and in alignment therewith, the longitudinal axis of said motion-transmitting rod and said bridge member being disposed substantially in a common plane, with the end of said rod projecting into the open side of said bridge member between the ends thereof.

2. In a bore gauge, a tubular shank having one end adapted to be connected to a dial indicator, a partially spherical gauge head mounted on the other end of said shank, said head having a cavity therein and a plurality of bores extending from said cavity to the outside of said head, a motion-transmitting rod extending through said shank with one end projecting through one of said bores into said cavity and the other end projecting from said shank for connection to said indicator, a movable feeler contact pin extending outward through another of said bores with its inner end engaging the end of said motion-transmitting rod, a pair of centering pins mounted in a pair of said bores one on each side of the movable contact pin, an approximately U-shaped bridge member interconnecting said centering pins and partially encircling the end of said motion-transmitting rod, a spring in said head yieldingly engaging said bridge member and urging said centering pins outwardly of said head, and a stationary contact pin projecting outwardly from said head in the opposite direction from said movable measuring pin and in alignment therewith, the longitudinal axis of said motion-transmitting rod and said bridge member being disposed substantially in a common plane, with the end of said rod projecting into the open side of said bridge member between the ends thereof, said bridge member and said motion-transmitting rod being disposed substantially in a diametral plane of said partially spherical gauge head.

3. In a bore gauge, a tubular shank having one end adapted to be connected to a dial indicator, a gauge head mounted on the other end of said shank, said head having a cavity therein and a plurality of bores extending from said cavity to the outside of said head, a motion-transmitting rod extending through said shank with one end projecting through one of said bores into said cavity and the other end projecting from said shank for connection to said indicator, a movable feeler contact pin extending outward through another of said bores with its inner end engaging the end of said motion-transmitting rod, a pair of centering pins mounted in a pair of said bores one on each side of the movable contact pin, an approximately U-shaped bridge member interconnecting said centering pins and partially encircling the end of said motion-transmitting rod, a pair of laterally-spaced spiral springs in said head yieldingly engaging said bridge member and urging said centering pins outwardly of said head, and a stationary contact pin projecting outwardly from said head in the opposite direction from said movable measuring pin and in alignment therewith, the longitudinal axis of said motion-transmitting rod and said bridge member being disposed substantially in a common plane, with the end of said rod projecting into the open side of said bridge member between the ends thereof, said springs being disposed substantially co-axial with said centering pins and engaging the ends of said bridge member.

ANDREW EISELE.

REFERENCES CITED

The following references are of record in the file of this patent:

UNITED STATES PATENTS

| Number | Name | Date |
|---|---|---|
| 2,192,900 | Eisele | Mar. 12, 1940 |
| 2,241,287 | Westcott | May 6, 1941 |
| 2,253,803 | Newberry | Aug. 26, 1941 |
| 2,385,122 | Worthen | Sept. 18, 1945 |
| 2,385,157 | Nilsson et al. | Sept. 18, 1945 |